United States Patent
Wu et al.

(10) Patent No.: US 10,459,888 B2
(45) Date of Patent: Oct. 29, 2019

(54) METHOD, APPARATUS AND SYSTEM FOR DATA ANALYSIS

(71) Applicant: Tencent Technology (Shenzhen) Company Limited, Shenzhen, Guangdong (CN)

(72) Inventors: Lei Wu, Shenzhen (CN); Hao Li, Shenzhen (CN); Weiji Zeng, Shenzhen (CN); Fuhan Cai, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 307 days.

(21) Appl. No.: 14/995,809

(22) Filed: Jan. 14, 2016

(65) Prior Publication Data

US 2016/0203156 A1 Jul. 14, 2016

Related U.S. Application Data

(63) Continuation of application No. PCT/CN2014/085745, filed on Sep. 2, 2014.

(30) Foreign Application Priority Data

Sep. 11, 2013 (CN) .......................... 2013 1 0413001

(51) Int. Cl.
*G06F 17/30* (2006.01)
*G06F 16/174* (2019.01)
(Continued)

(52) U.S. Cl.
CPC ...... *G06F 16/1748* (2019.01); *G06F 16/2465* (2019.01); *G06F 16/2474* (2019.01); *G06F 16/24554* (2019.01)

(58) Field of Classification Search
CPC ......... G06F 17/30539; G06F 17/30156; G06F 17/30486; G06F 17/30548; G06F 16/1748;
(Continued)

(56) References Cited

U.S. PATENT DOCUMENTS 7,222,133 B1\* 5/2007 Raipurkar ........... G06F 11/1458
707/642
8,191,040 B2\* 5/2012 Hejlsberg .............. G06F 9/4488
717/114
(Continued)

FOREIGN PATENT DOCUMENTS

CN 102163226 A 8/2011
CN 102314336 A 1/2012

OTHER PUBLICATIONS

International Searching Authority, The State Intellectual Property Office, Form PCT/ISA/210 for IA Application No. PCT/CN2014/085745, International Search Report (English translation), dated Nov. 10, 2014.
Haifei Wang, et al.; "MQT Based on Hadoop Cloud Computing in Tobacco Marketing Decision Analysis"; Industrial Control Computer; vol. 25, issue 12; p. 101-103; Dec. 25, 2012.
(Continued)

*Primary Examiner* — Huawen A Peng
(74) *Attorney, Agent, or Firm* — Anova Law Group, PLLC

(57) ABSTRACT

A method, apparatus and system for data analysis are provided by the embodiments of the disclosure, which may solve the problem of low efficiency of the data analysis. The disclosed method includes: retrieving pipeline data from a pipeline data set piece by piece, wherein each piece of pipeline data includes attribute values of multiple views; performing normalization sorting of the retrieved pipeline data based on the attribute value in a predefined view; obtaining an attribute value entry list by extracting attribute value entries from the normalization sorted pipeline data; obtaining a first characteristic value list by performing
(Continued)

deduplication operation on the attribute value entry list through mapper operation; obtaining a second characteristic value list by performing accumulation operation on the first characteristic value list through reducer operation; and obtaining a result of the predefined indicator by analyzing the second characteristic value list.

18 Claims, 9 Drawing Sheets

(51) Int. Cl.
*G06F 16/2455* (2019.01)
*G06F 16/2458* (2019.01)

(58) Field of Classification Search
CPC .......... G06F 16/2465; G06F 16/24554; G06F 16/2474
See application file for complete search history.

(56) References Cited

U.S. PATENT DOCUMENTS

| 2005/0171746 | A1* | 8/2005 | Thalhammer-Reyero ................... G05B 17/02 703/2 |
| 2011/0066649 | A1 | 3/2011 | Berlyant et al. |
| 2011/0066894 | A1 | 3/2011 | Berlyant et al. |
| 2012/0254193 | A1 | 10/2012 | Chattopadhyay et al. |
| 2013/0191372 | A1* | 7/2013 | Lee ................... G06F 17/30958 707/722 |
| 2015/0039623 | A1* | 2/2015 | Pandit ............... G06F 17/30557 707/740 |

OTHER PUBLICATIONS

The State Intellectual Property Office of the People's Republic of China (SIPO) Office Action 1 for 201310413001.4 dated Jul. 24, 2018 5 Pages (including translation).

* cited by examiner

METHOD, APPARATUS AND SYSTEM FOR DATA ANALYSIS

CROSS-REFERENCE TO RELATED APPLICATIONS

This application is a continuation application of International Application PCT/CN2014/085745 filed on Sep. 2, 2014, which claims the priority benefit of Chinese Patent Application No. 201310413001.4 filed on Sep. 11, 2013, the disclosures of which are incorporated by reference herein in their entirety for all intended purposes.

FIELD OF THE INVENTION

The disclosure relates to the field of Internet technology, and more specifically, to a method, apparatus and system for data analysis.

BACKGROUND

With the increasingly development of the Social Networking Services (SNS) and the number of the user of the Internet, the size of user data generated at the network side is increasing geometrically. The processing and analyzing of the user data is becoming more and more important for the business decision of network operators. Usually, the database at the network side obtains valuable parameters such as the behavior habit of the user, the popularity of the application, etc, by analyzing user data of Terabyte level.

During the data analysis, the database performs deduplication and accumulation operation on thousands of or millions of user data with respect to various indicators that the operators expect to acquire from the process of user data analysis. For example, there includes five pieces of user data (also called five pieces of pipeline data), each of which is used to record the behavior data of a user. Said deduplication operation is used to eliminate repeated user data regarding to a specified indicator. For example, when calculating an indicator of "number of online active person of the application", a user having User Identity (ID) of 1001 has visited an application having application ID of 1 twice. Thus, when calculating the number of online active person of the application 1, the two pieces of user data generated by the twice visitation need to be deduplicated, thereby only one piece of user data generated by the user 1001 is reserved. That is, the number of visitation of application 1 is adjusted to the number of person visiting the application 1, to avoid the error differences of the indicator brought by the multiple pieces of user data, which is generated by the same user. Said accumulation operation is to add multiple user data of a same category together, to obtain a corresponding result of the indicator. For example, when calculating the indicator "number of online active person of the application", both user 1002 and user 1003 visited application 2 respectively. Then, when calculating the number of online active person of the application 2, the two pieces of user data generated by two different users 1002 and 1003 are accumulated together to obtain that the number of online active persons for application 2 is 2. As can be seen, the accumulation operation is used to obtain a result of an indicator, and the deduplication operation is used to perform error difference elimination for the user data on which the accumulation operation is based. When performing user data analysis, the commonly used implementation method is to perform deduplication operation on the original user data by a first mapper&reducer process, and then to perform accumulation operation on the deduplicated user data by a second mapper&reducer process, so as to obtain a corresponding result of an indicator.

The present data analysis process needs to perform twice mapper&reducer processes. However, too many stages of mapper&reducer may cost numerous computation resource of the database. Especially when there are lots of indicators to be computed, the computation task of the database will be too large to handle by the database system.

With the upcoming of the age of big data, there arises a cube data structure, such as the On-Line Analytical Processing (OLAP) system. This data structure may store multidimensional data, wherein each piece of data can be described in different views and the user data may be analyzed and searched from different views or any combination of the multiple views. An exemplary cube data structure is shown in FIG. 2, in which the stored data possesses attributes of three views, "product type", "area" and "time". In this data structure, each piece of data can be described from different views. As the shape of this data structure looks like a cube, therefore it is named as the cube data structure.

The cube data structure based data analysis has a prominent feature, i.e., an indicator may be analyzed from different views or the combination of the views. Taken FIG. 2 as an example, the data that meets the conditions of the indicators may be filtered from two separate views "product type" and "area", and it may also be filtered from two different view combinations, "product type"+"area" and "product type"+"time", respectively. Each piece of data in the data structure may be illustrated from different views.

In practice, the number of the views of the cube data structure involved in the data analysis varies from dozens to thousands. Thus, the number of the combinations of the views obtained through permutation and combination may be much larger. While the data analysis for each view or view combination needs to go through various computation processes such as data loading, deduplication operation, accumulation operation and so on, such many views or view combinations may result in unexpected computation complexity. If these independent computation processes are executed serially, the time cost will greatly exceed the acceptable range of the operators; if executed in parallel, the database will have a heavy burden and the computation bottleneck may happen.

In general, the present ways for data analysis have too much computation complexity and low data processing efficiency, which may cost more time and more computation resource.

SUMMARY OF THE INVENTION

A method, apparatus and system for data analysis are provided by the embodiments of the disclosure, which may solve the problem of low efficiency of the data analysis.

According to one aspect of the embodiments of the disclosure, a method for data analysis is provided. The method includes:

retrieving pipeline data from a pipeline data set piece by piece, wherein each piece of pipeline data includes attribute values of multiple view;

performing normalization sorting of the retrieved pipeline data based on the attribute value in a predefined view;

obtaining an attribute value entry list by extracting attribute value entries from the normalization sorted pipeline data;

obtaining a first characteristic value list by performing deduplication operation on the attribute value entry list through mapper operation;

obtaining a second characteristic value list by performing accumulation operation on the first characteristic value list through reducer operation; and obtaining a result of the predefined indicator by analyzing the second characteristic value list.

According to another aspect of the embodiments of the disclosure, an apparatus for data analysis is provided. The apparatus includes:

a data retrieving unit, configured to retrieve pipeline data from a pipeline data set piece by piece, wherein each piece of pipeline data includes attribute values of multiple view;

a data sorting unit, configured to perform normalization sorting of the retrieved pipeline data based on the attribute value in a predefined view;

an attribute extraction unit, configured to obtain an attribute value entry list by extracting attribute value entries from the normalization sorted pipeline data;

an attribute deduplication unit, configured to obtain a first characteristic value list by performing deduplication operation on the attribute value entry list through mapper operation;

an attribute accumulation unit, configured to obtain a second characteristic value list by performing accumulation operation on the first characteristic value list through reducer operation; and a result analysis unit, configured to obtain a result of the predefined indicator by analyzing the second characteristic value list.

According to another aspect of the embodiments of the disclosure, a system for data analysis is provided. The system includes a control server and a computing server, wherein, the control server is configured to sort multiple data analysis tasks in priority order, submit data analysis tasks to the computing server, and receive and record the data analysis status of the computing server;

the computing server is configured to: retrieve pipeline data from a pipeline data set piece by piece, wherein each piece of pipeline data includes attribute values of multiple view; perform normalization sorting of the retrieved pipeline data based on the attribute value in a predefined view; obtain an attribute value entry list by extracting attribute value entries from the normalization sorted pipeline data; obtain a first characteristic value list by performing deduplication operation on the attribute value entry list through mapper operation; obtain a second characteristic value list by performing accumulation operation on the first characteristic value list through reducer operation; and obtain a result of the predefined indicator by analyzing the second characteristic value list.

The method, apparatus and system for data analysis as described in the foregoing embodiments can perform preprocessing operation on the original pipeline data before the data analysis, such that the data size and computation complexity involved in the subsequent analysis process can be greatly reduced. In particular, the method, apparatus or system performs normalization sorting for the acquired pipeline data based on the attribute value in the predefined view, obtains the attribute value entry list by extracting attribute value entry from the normalization sorted pipeline data, performs deduplication and accumulation operation through one time mapper&reducer operation, and obtains the result of the indicator by analysis. Compared with the existed technology which needs twice mapper&reducer operations to have a result of an indicator, the disclosed method, apparatus or system may decrease the computation complexity for data analysis, and regarding the scenario of big data, the disclosed method, apparatus or system can avoid the happens of bottleneck of the database system and improve the efficiency of data analysis of the system.

Moreover, as the pipeline data to be processed have been through the preprocessing operation before data analysis, in which the acquired pipeline data have been normalization sorted based on the attribute value in the predefined view, the disclosed method, apparatus or system may sort the multiple pieces of pipeline data such that the pipeline data with a same attribute value in the predefined view is being adjacent to each other. In terms of cube data structure, this enables the method, apparatus or system to analyze the data in multiple view or view combinations concurrently when performing deduplication and accumulation operation. As compared with existed technology, the disclosed method, apparatus or system can accomplish data analysis in multiple view or view combinations once a time when the operator needs the data analysis of tens of thousands of views or view combinations, which avoids the occupancy of time and system computation resource during the multiple accesses of the pipeline data. When applied to cube data structure, the disclosed method, apparatus or system has another advantage of greatly improving the efficiency of data analysis of the system.

DESCRIPTION OF THE DRAWINGS

To illustrate the technical solutions in the embodiments of the present disclosure more clearly, the following briefly introduces the accompanying drawings required for describing the embodiments of the disclosure. Apparently, the accompanying drawings in the following description show merely some embodiments of the present disclosure, and persons of ordinary skill in the art may still derive other drawings from these accompanying drawings without creative efforts.

DETAILED DESCRIPTION

To better illustrate the purpose, technical solution and advantages of the present disclosure, the present disclosure will be further described in detail in conjunction with the accompanying drawings and embodiments in the below. Apparently, the described embodiments are merely a part rather than all of the embodiments of the present disclosure. All other embodiments obtained by persons of ordinary skill in the art based on the embodiments of the present disclosure without creative efforts shall fall within the protection scope of the present disclosure.

To better illustrate the embodiments in the below, a brief description of the network architecture involved in the embodiments of the disclosure is firstly introduced.

Figures 1, 2:
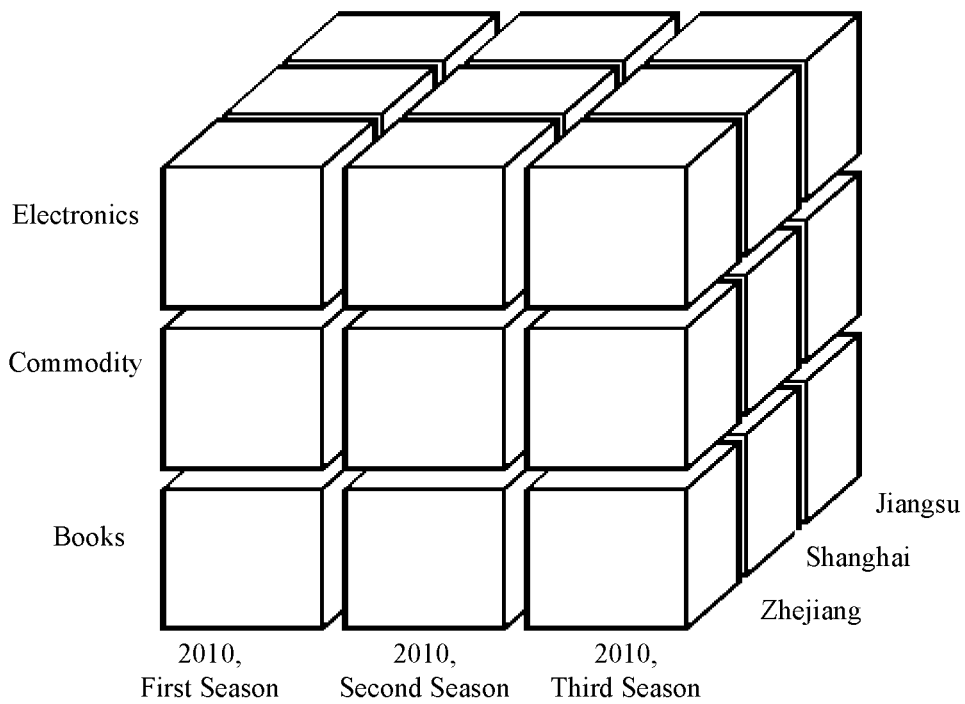
FIG. 1 is a storage list containing user data in the prior art.
FIG. 2 is an exemplary diagram of the cube data structure in the prior art.
Figure 3:
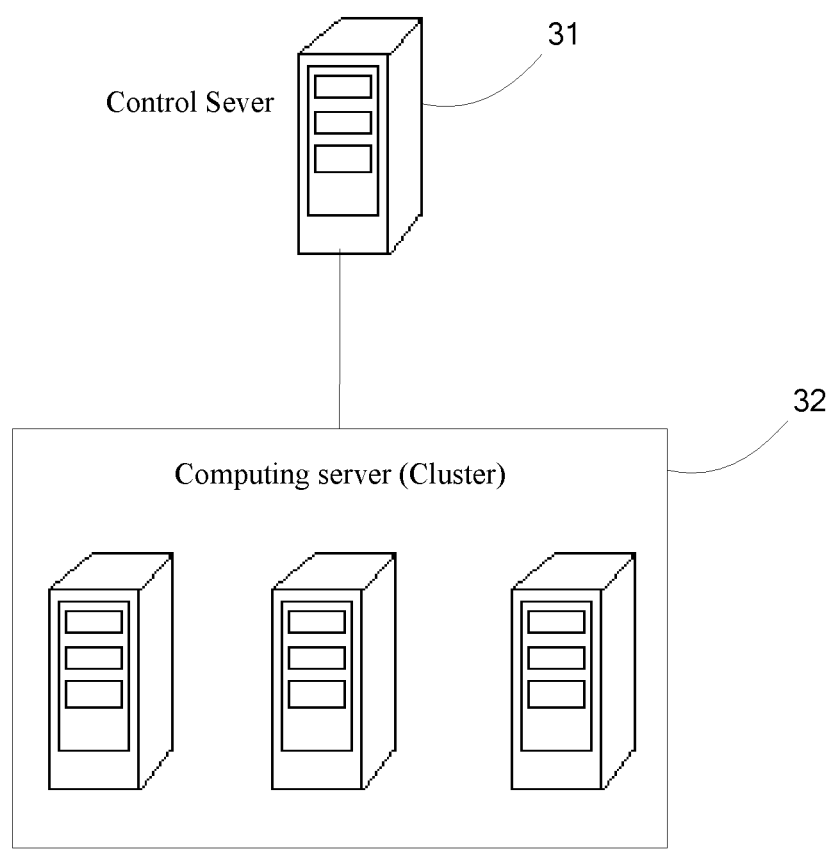
FIG. 3 shows structural diagram of a system for data analysis in accordance with the embodiments of the present disclosure.

As shown in FIG. 3, the network architecture of the database includes control server 31 and computing server 32. Wherein, the computing server 32 may be a computing server cluster consisted of multiple sub-servers. In FIG. 3, the control server 31 is configured to scan a pipeline queue, read out a data analysis task from the head of the queue sequentially, and submit the acquired data analysis task to the computing server 32. Upon receiving the data analysis task, the computing server 32 acquires a pipeline file corresponding to the data analysis task. The pipeline file contains multiple pieces of pipeline data generated from online behaviors of users. The computing server 32 performs preprocessing operation, deduplication operation and accumulation operation based on these pipeline data, and obtains corresponded results of indicators. Then the computing server returns a data analysis status flag, which identifies that the process is successful, to the control server 31. On the other hand, if the computation fails and no corresponded results of indicators are obtained, the computing server returns another data analysis status flag identifying an unsuccessful process. After receiving the data analysis status flag sent by the computing server 32, the control server 31 reads out next data analysis task from the pipeline queue and submits it to the computing server 32.

Figure 4:
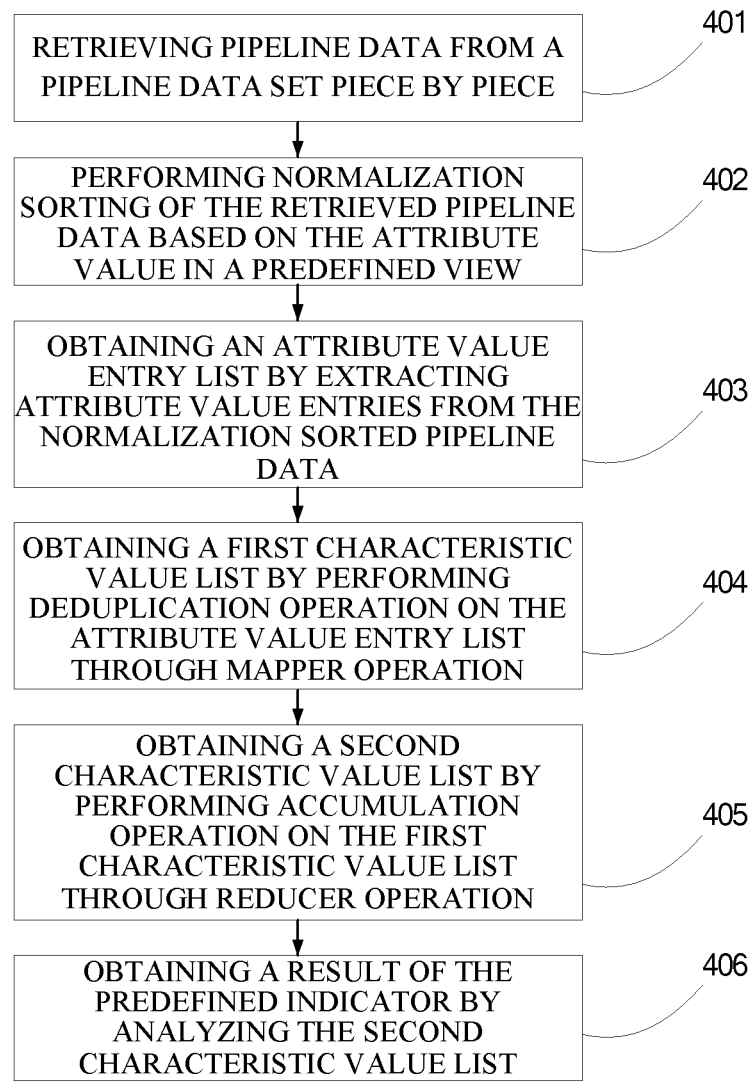
FIG. 4 shows process flow diagram of a method for data analysis in accordance with the embodiments of the present disclosure.

Next, a method for data analysis in the embodiments is described based on the system shown in FIG. 3. Said method is applied to the computing server 32 side. As shown in FIG. 4, the method includes following steps:

Step 401, retrieving pipeline data from the pipeline data set piece by piece.

In the present embodiment, the pipeline data set is contained in the above-mentioned pipeline file. Generally, regarding to different predefined indicators, the computing server may perform the computation on different pipeline files. Said predefined indicators are variables indicating expectations of the operators for the data analysis, and these variables are provided by the operators to the data analysis system. The variables, for example, may be variables such as "number of online active person of the application", "average online time of users". According to the needs of the operators, the computing server computes different indicators based on different pipeline files and obtains corresponded result of the indicators, for example, the indicator "number of online active person of the application" may be 120000 persons, the "average online time of users" is 2 hours. In practice, the computing server may compute one indicator based on one pipeline file, and also may compute several indicators based on one pipeline file. When the computing server finishes the computation of the one indicator, the computing server receives a next data analysis task submitted by the control server and computes another indicator based on the same pipeline file or another different pipeline file.

One piece of pipeline data is used to describe one time of online operation behavior of a particular user, the operation behavior of a user usually contains descriptors illustrated from several different views (referred to as "attribute" hereinafter). Therefore, one piece of pipeline data usually contains attributes of several views. For example, Chart 1 describes an example of pipeline data:

CHART 1

| User ID | Application ID | Gender of user | Age of user | Start clock of the operation |
|---|---|---|---|---|
| A | 1 | 0 | 23 | 12:37 |
| B | 3 | 1 | 15 | 20:04 |

Chart 1 includes two pieces of pipeline data, each of which has attributes from five views, "User ID", "Application ID", "Gender of user", "Age of user" and "Start clock of the operation". Wherein, the "User ID" may be data information for uniquely identifying the user, such as QQ number/telephone number/email account, etc; "Application ID" may be data information that uniquely identifies different applications. Similarly, the pipeline date may include "SNS website ID". In the view "Gender of user", bit "1" represents male, and bit "0" represents female.

Regarding the relational database, the server stores attributes of the pipeline data from multiple view with one view connected to another view through multiple relational data sheet. For example, a relational data sheet between view 1 and view 2 may be set up, and then another relational data sheet between view 2 and view 3 may be set up. Regarding cube database, the server may store the pipeline data in multiple view. Both the relational database and the cube database involves in the multidimensional pipeline data.

Usually, the pipeline data includes tens of thousands of pieces of pipeline data. For example, the computing server needs to acquire the behavior data of the currently online users of a certain SNS website. If there are 8600 online users at the present time, the computing server can acquire 8600 pieces of pipeline data. As another example, the computing server needs to acquire the behavior data of the users playing a certain SNS game application during a specified time period. If there are 5400 playing records during the specified time period, the computing server can acquire 5400 pieces of pipeline data. This example is different from the previous example in that: in this example, there usually exists a possibility that one user played this game at different times. Thus, these 5400 pieces of pipeline data includes several pieces of pipeline data that are generated by a same user at different times. As described above, one piece of pipeline data is used to describe one time of online operation behavior of a particular user, therefore parts of the pipeline data are needed to be deduplicated when calculating some indicators such as the number of online active person during the certain time period (rather than the number of online active records during the certain time period), otherwise the calculated result of indicators may contain error difference.

Step 402, performing normalization sorting for the acquired pipeline data based on the attribute values in the predefined views.

To reduce the subsequent computation complexity, the server may perform preprocessing operation to the pipeline data, before the deduplication operation and the accumulation operation. The preprocessing operation includes a normalization sorting for the acquired pipeline data, i.e., sorting the pipeline data with same attribute value in the predefined view as being adjacent to each other based on the attribute values in the predefined views.

The predefined view is a certain view of the pipeline data. The computation sever may select different views as the predefined view for different indicators. For example, regarding indicator "number of currently online active person", the computing server selects a view "User ID" as the predefined view. In particular, the 7 pieces of pipeline data of three users retrieved by the computing server in a chronological order are shown in Chart 2.

CHART 2

| User ID | Application ID | Gender of user | Age of user |
|---------|----------------|----------------|-------------|
| A | 1 | 0 | 23 |
| B | 2 | 1 | 14 |
| B | 3 | 1 | 14 |
| C | 3 | 0 | 51 |
| A | 1 | 0 | 23 |
| B | 1 | 1 | 14 |
| C | 3 | 0 | 51 |

The pipeline data list generated after the normalization sorting by the computing server using the attribute value in the view "User ID" is shown in Chart 3.

CHART 3

| User ID | Application ID | Gender of user | Age of user |
|---------|----------------|----------------|-------------|
| A | 1 | 0 | 23 |
| A | 1 | 0 | 23 |
| B | 2 | 1 | 14 |
| B | 3 | 1 | 14 |
| B | 1 | 1 | 14 |
| C | 3 | 0 | 51 |
| C | 3 | 0 | 51 |

Step 403, obtaining attribute value entry list formed by extracting attribute value entries from the normalization sorted pipeline data piece by piece, After the normalization sorting, the computing server extracts a piece of attribute value entry from each piece of pipeline data sequentially, and obtains an attribute value entry list including multiple pieces of attribute value entry. Taken the first piece of pipeline data in Chart 3 as an example, the attribute value entry extracted by the computing server is "A, 1, 0, 23", i.e., the attribute values of "User ID", "Application ID", "Gender of user" and "Age of user" corresponding to User A are sequentially extracted. With respect to 7 pieces of pipeline data in Chart 3, an attribute value entry list obtained by the computing server is shown in Chart 4:

CHART 4

| A, | 1, 0, 23 |
| A, | 1, 0, 23 |
| B, | 2, 1, 14 |
| B, | 3, 1, 14 |
| B, | 1, 1, 14 |
| C, | 3, 0, 51 |
| C, | 3, 0, 51 |

Step 404, obtaining a first characteristic value list by performing deduplication operation on the attribute value entry list through mapper operation.

As can be seen from Chart 4, when calculating the indicator "number of currently online active person", there exists repeated attribute value entry. For example, the first attribute value entry and the second attribute value entry indicate two times of operation behavior generated by User A at different times. Therefore, this type of attribute value entry needs to be deduplicated to obtain the first characteristic value list, which is shown in Chart 5:

CHART 5

| A, | 1, 0, 23 |
| B, | 2, 1, 14 |
| B, | 3, 1, 14 |
| B, | 1, 1, 14 |
| C, | 3, 0, 51 |

The deduplication operation performed to the attribute value entries by the computing server is dependent on the deduplication requirement for different indicators. For example, regarding Chart 5, the indicator is the number of currently online active person of each application, thus the exactly same attribute value entry needs to be deduplicated. Alternatively, if the indicator is changed to the number of currently online active person of the entire network, the attribute value entries needed to be deduplicated within Chart 5 further include 3 pieces of attribute value entries generated by User B. The following part of the present embodiment is described by taking the example of indicator of number of currently online active person of each application.

Step 405, obtaining a second characteristic value list by performing accumulation operation on the first characteristic value list through reducer operation.

Regarding the first characteristic value list as shown in Chart 5, the computing server accumulates entries having same application ID, and then obtains a second characteristic value list as shown in Chart 6:

CHART 6

| Application ID | Number of online active person |
|----------------|-------------------------------|
| 1 | 2 |
| 2 | 1 |
| 3 | 2 |

Wherein, the number of online active person for application 1 is obtained by accumulating the first row of attribute value entry with the fourth row of attribute value entry in Chart 5, the number of online active person for application 3 is obtained by accumulating the third row of attribute value entry with the fifth row of attribute value entry in Chart 5.

Step 406, obtaining result of the predefined indicator by analyzing the second characteristic value list.

The computing server may obtain the number of currently online active person of each application by analyzing the second characteristic value list shown in Chart 6. The acquired results of the predefined indicator are shown as Chart 7 to Chart 9:

CHART 7

| Application ID | Number of online active person |
|---|---|
| 1 | 2 |

CHART 8

| Application ID | Number of online active person |
|---|---|
| 2 | 1 |

CHART 9

| Application ID | Number of online active person |
|---|---|
| 3 | 2 |

The method for data analysis, in accordance with the present embodiment, includes: performing normalization sorting for the pipeline data before the deduplication operation and the accumulation operation; performing deduplication operation to the normalization sorted pipeline data through mapper operation; and performing the accumulation operation through reducer operation. Thus, the method of the present embodiment can obtain the result of the indicator by one time mapper&reducer operation. Compared with the existed technology, in which the deduplication and accumulation operations are performed by twice mapper&reducer operations respectively, the number of cascade of the mapper&reducer operation may be reduced. Thus this method can greatly decrease the computation complexity of the computing server, increase the computing speed for the indicator, and improve the computation efficiency of the data analysis system. These advantages make this method more suitable for big data scenario such as cube database.

Figure 5:
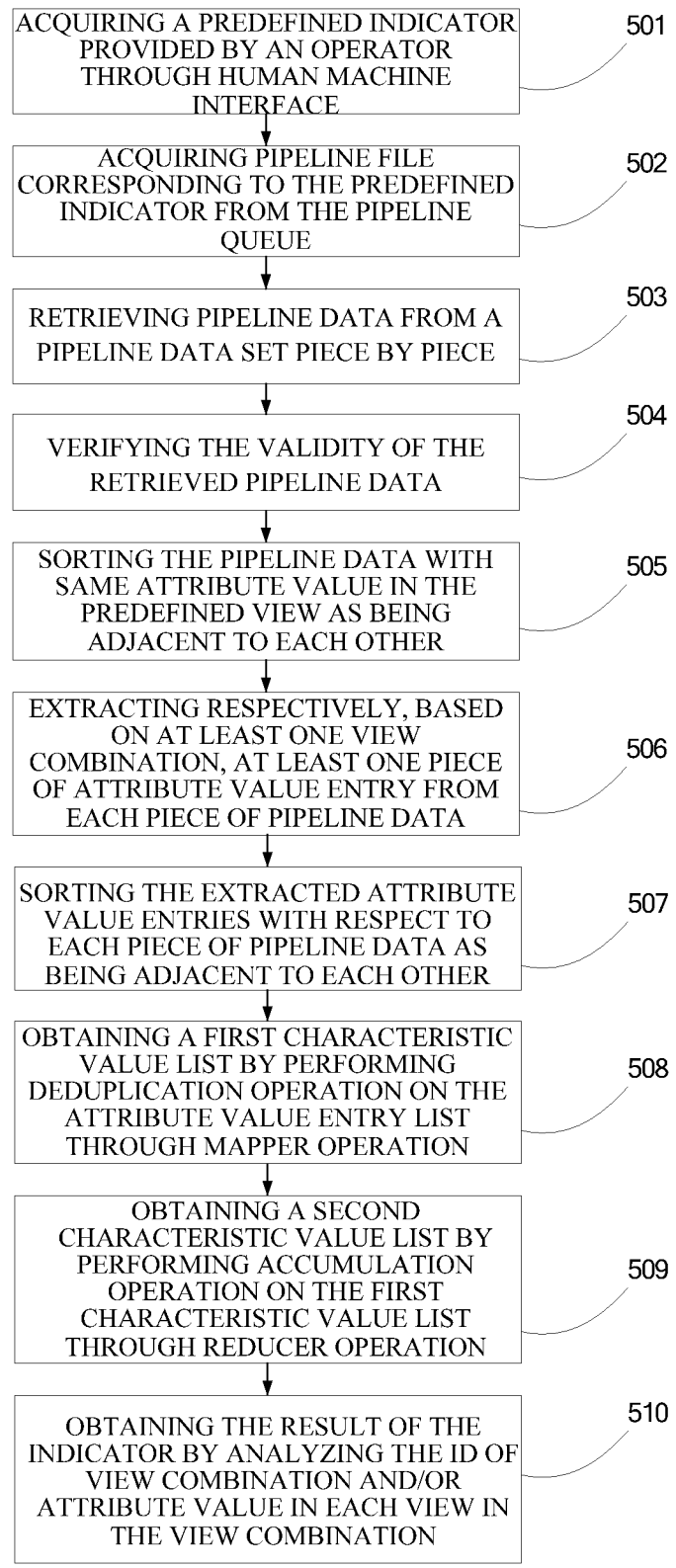
FIG. 5 shows process flow diagram of another method for data analysis in accordance with the embodiments of the present disclosure.

As a further development of the method described in FIG. 4, the disclosure further provides another method for data analysis in another embodiment. As shown in FIG. 5, the method includes:

Step 501, acquiring a predefined indicator provided by an operator through Human Machine Interface The data analysis system receives the predefined indicator inputted by the operator. This embodiment is described by taking indicator "number of currently online active person of the application" as an example.

Alternatively, the data analysis system may receive a predefined indicator, and may also receive multiple predefined indicators. When the data analysis system receives multiple predefined indicators, the multiple predefined indicators is sorted in priority order and calculated sequentially in priority order.

When running the priority ranking, parameters of the indicator may be taken into consideration, the parameters includes, but not limited to: computation complexity of the predefined indicator, the importance or emergency of the predefined indicator for the user or the operator.

Step 502, acquiring pipeline file corresponding to the predefined indicator from the pipeline queue.

After the predefined indicator to be calculated is determined, pipeline file corresponding to the predefined indicator is fetched from the pipeline queue.

Specifically, after sorting the multiple predefined indicators in priority order in step 501, the pipeline files corresponding to respective predefined indicators shall be taken into the queue in the sorted sequence, such that the pipeline file corresponding to the current predefined indicator can be fetched from the pipeline queue in step 502.

Step 503, retrieving pipeline data from the pipeline data set piece by piece.

Taken the computation of indicator "number of currently online active person of the application" as an example, the computing server retrieves each pipeline data sequentially, starting from the first piece of pipeline data in the corresponded pipeline file.

Step 504, verifying the validity of the retrieved pipeline data.

As an alternative approach of the present embodiment, the computing server may verify the validity of the pipeline data before performing normalization sorting for the pipeline data (i.e., before executing step 504). Said valid pipeline data refers to data that can truly reflect the operation behavior of the user. The purpose of performing verification of validity is, for example, to remove the pipeline data with bad quality, which is generated by "Internet Water Army" (also called paid posters), so as to ensure the truth of the pipeline data and then the accuracy of the result of the predefined indicator.

Step 505, sorting the pipeline data with same attribute value in the predefined view as being adjacent to each other.

The computing server performs adjacency sorting for the pipeline data shown in Chart 10 based on the attribute value in the "User ID" view. The sorted pipeline data are shown in Chart 11. Wherein the first row within Charts 10 and 11 includes IDs of views.

CHART 10

| 1 | 2 | 3 | 4 |
|---|---|---|---|
| User ID | Application ID | Gender of user | Age of user |
| A | 1 | 1 | 18 |
| A | 2 | 1 | 18 |
| B | 3 | 0 | 20 |
| A | 3 | 1 | 18 |
| A | 1 | 1 | 18 |

CHART 11

| 1 | 2 | 3 | 4 |
|---|---|---|---|
| User ID | Application ID | Gender of user | Age of user |
| A | 1 | 1 | 18 |
| A | 2 | 1 | 18 |
| A | 3 | 1 | 18 |
| A | 1 | 1 | 18 |
| B | 3 | 0 | 20 |

Step 506, extract respectively, based on at least one view combination, at least one piece of attribute value entry from each piece of pipeline data.

As an alternative approach of the present embodiment, the computing server may concurrently compute several view combinations during one computation process, wherein each view combination includes at least one non-predefined view.

Usually, when calculating a certain indicator, the certain indicator may be processed in multiple view or multiple view combinations. For example, regarding the pipeline data shown in Chart 11, the indicator "number of currently online active person of the application" may be calculated in the view of "Application ID", and it also may be calculated in the view combination "Application ID"+"Gender of user". In the existed technology, the data analysis system calculates different view combinations separately. Then, each calculation needs to retrieve pipeline data and perform mapper&reducer operation separately. As a result of this, the result computation tasks are incredibly heavy. For big data scenario, the bottleneck of the system may easily happen. By contrast, the data analysis system in the present embodiment may calculate tens of thousands of view combinations corresponding to one indicator at the same time, only one time of retrieving pipeline data is needed. Thus the computation complexity of the system can be greatly reduced.

Specifically, for example, when the computing server calculates the indicator "number of currently online active person of the application" in two view combination, i.e., "Application ID" and "Application ID"+"Gender of user", the detailed process is as follows:

Regarding each view combination, the computing server extracts attribute value corresponding to each non-predefined view in the view combination from the pipeline data respectively, and then obtains at least one attribute value.

For example, regarding the first piece of pipeline data in Chart 11, the computing server respectively extracts one attribute value "1" (i.e., the attribute value of the Application ID) that corresponds to the view combination "Application ID", and two attribute value "1, 1" (i.e., the attribute values of the Application ID and the Gender of user) that corresponds to the view combination "Application ID"+"Gender of user".

Then, the computing server may combine the attribute value in the predefined view, the ID of the view combination and the at least one attribute value together to obtain one piece of attribute value entry.

Regarding the first piece of pipeline data in Chart 11, this piece of pipeline data corresponds to predefined view of attribute value "A". Said ID of the view combination is used to distinct multiple view combinations from each other when calculating multiple view combinations. The ID of the view combination "Application ID" is "11", while the ID of the view combination "Application ID"+"Gender of user" is "13". The attribute value entry obtained from the view combination "Application ID" is shown in the first row of Chart 12, and the attribute value entry obtained from the view combination "Application ID"+"Gender of user" is shown in the second row of Chart 12.

CHART 12

A, 11, 1
A, 13, 1, 1

Wherein, the "1" contained in the first row is the attribute value 1 corresponding to the view combination "Application ID", and the "1, 1" contained in the second row are attribute values 1 and 1 respectively corresponding to the view combination "Application ID"+"Gender of user". In this way, the computing server may generate multiple pieces of attribute value entries corresponding to multiple view combinations, and thus achieves the concurrently computation of multiple view combinations.

Regarding the pipeline data in Chart 11, the attribute value entry list obtained by the computing server is shown in Chart 13.

CHART 13

A, 11, 1
A, 11, 2
A, 11, 3
A, 11, 1
B, 11, 3
A, 13, 1, 1
A, 13, 2, 1
A, 13, 3, 1
A, 13, 1, 1
B, 13, 3, 0

Wherein, the previous five pieces of attribute value entries are attribute value entries corresponding to the view combination "Application ID", and the last five pieces of attribute value entries are attribute value entries corresponding to the view combination "Application ID"+"Gender of user".

Step 507, sorting the extracted attribute value entries with respect to each piece of pipeline data as being adjacent to each other.

Similar to the normalization sorting described in step 402 of FIG. 4, the computing server sorts Chart 13 with respect to the attribute value in view "User ID", and obtains an attribute value entry list as shown in Chart 14.

CHART 14

A, 11, 1
A, 13, 1, 1
A, 11, 2
A, 13, 2, 1
A, 11, 3
A, 13, 3, 1
A, 11, 1
A, 13, 1, 1
B, 11, 3
B, 13, 3, 0

In an alternative embodiment, in step 506, the computing server does not move to process next piece of pipeline data until the attribute value entries of all the view combinations corresponding to each pipeline data have been obtained. In this manner, the sorting operation in step 507 may be reserved.

After obtaining the attribute value entry list shown in Chart 14, the computing server outputs the attribute value entries in standard string format. Wherein, the attribute value "Application ID" (i.e., the attribute value in the predefined view) is assigned to "Key", and the rest ID of the view combination and the attribute value in non-predefined views are assigned to "item". The character "/t" is a separator.

Step 508, obtaining a first characteristic value list by performing deduplication operation on the attribute value entry list through mapper operation.

Specifically, the operation of step 508 is divided into several sub-steps.

Sub-step 508a, sequentially retrieving by the computing server the attribute value in the predefined view of each attribute value entry in the attribute value entry list.

For example, in Chart 14, starting from the first piece of attribute value entry, sequentially retrieving the attribute values in view "User ID": "A, A, A, A, A, A, A, A, B, B,".

The computing server has previous set a first attribute value variable "last_key". When retrieving the first piece of attribute value entry, the attribute value "A" of this attribute value entry is assigned to the last_key.

Sub-step 508b, comparing the acquired attribute value in the predefined view with preset first attribute value variable.

When reading out the subsequent attribute value entry, the computing server compares the acquired attribute value with the variable value in the last_key. If these two values are the same, it indicates that these two pieces of attribute value entries are generated by a same user, and the process will move to sub-step 508c; otherwise, it indicates that these two pieces of attribute value entries are generated by different users, and the process will move to sub-step 508d.

Sub-step 508c, writing the corresponded attribute value entry into current first characteristic value child list.

Said first characteristic value child list in fact is a first characteristic value list of a particular user. The purpose of sub-steps 508c and 508d is to divide all the attribute value entry owned by a user into a same child list.

Sub-step 508d, writing the corresponded attribute value entry into a new first characteristic value child list, and writing the attribute value in the predefined view into the first attribute value variable.

For example, when reading out the piece of attribute value entry in the ninth row of the Chart 14, the attribute value in the view "User ID" of this entry is "B", which is different from the variable value "A" in the last_key. As the adjacency sorting with respect to the attribute value in the view "User ID" has been performed for the attribute value entry previously, the computing server determines that all the attribute value entries of user "A" have been acquired. So a new first characteristic value child list is set up for the attribute value entry of user "B" and variable last_key is assigned as "B".

The purpose of sub-steps 508a-508d is to partition the attribute value entry list into multiple child lists based on the attribute value in view "User ID". For the attribute value entry list shown in Chart 14, the partitioned child lists corresponding to user "A" and user "B" are shown in Chart 15 and Chart 16 respectively.

CHART 15

| key | value |
|---|---|
| 11, 1 | 1 |
| 13, 1, 1 | 1 |
| 11, 2 | 1 |
| 13, 2, 1 | 1 |
| 11, 3 | 1 |
| 13, 3, 1 | 1 |
| 11, 1 | 1 |
| 13, 1, 1 | 1 |

CHART 16

| key | value |
|---|---|
| 11, 3 | 1 |
| 13, 3, 0 | 1 |

Wherein, the attribute values in view "User ID" have been removed and the rest of the attribute value entry is regarded as "key", also the number of person "value" is added. Each piece of attribute value entry stands for a person. Therefore, the item "value" of all the attribute value entries may be initialized as "1".

Sub-step 508e, sequentially traversing the attribute value entries within each first characteristic value child list and deleting repeated attribute value entries.

This deduplication process may also be achieved by setting a variable last_key. In the same child list (i.e., all the attribute value entries of a same user), the attribute value in view "Application ID" in the currently traversed attribute value entry is assigned to last_key. When the traversing process is moved to a next attribute value entry, if the attribute value in view "Application ID" in the next attribute value entry is the same as the variable value in the last_key, it indicates that the next attribute value entry is a repeated attribute value entry, which will be removed by the computing server.

In the child list of user A as shown in Chart 15, the first piece of attribute value entry is repeated with the seventh piece of attribute value entry, and the second piece of attribute value entry is repeated with the eighth piece of attribute value entry. Therefore, the seventh and eighth pieces of attribute value entries are removed and the deduplicated child list is shown in Chart 17.

CHART 17

| key | value |
|---|---|
| 11, 1 | 1 |
| 13, 1, 1 | 1 |
| 11, 2 | 1 |
| 13, 2, 1 | 1 |
| 11, 3 | 1 |
| 13, 3, 1 | 1 |

The child list of user B does not include any repeated attribute value entry, therefore the deduplicated child list of user B is same as the list shown in Chart 16.

Sub-step 508f, obtaining the first characteristic value list by aggregating multiple first characteristic value child list in which the repeated attribute value entries are removed.

The computing server will aggregate chart 17 and chart 18 for use in the subsequent accumulation operation. The first characteristic value list after aggregation is shown in chart 18.

CHART 18

| key | value |
|---|---|
| 11, 1 | 1 |
| 13, 1, 1 | 1 |
| 11, 2 | 1 |
| 13, 2, 1 | 1 |
| 11, 3 | 1 |
| 13, 3, 1 | 1 |
| 11, 3 | 1 |
| 13, 3, 0 | 1 |

Wherein, the first to the sixth pieces of attribute value entries belong to the attribute value entries of the user A, and the seventh to the eighth pieces of attribute value entries belong to the attribute value entries of the user B.

The computing server outputs the attribute value entry in standard string format. Wherein, the attribute value of line key in chart 18 is assigned to "Key", and the value "1" of item "value" is assigned to "item". The character "/t" is a separator.

Step 509, obtaining a second characteristic value list by performing accumulation operation on the first characteristic value list through reducer operation.

Specifically, the operation of step 509 is divided into two sub-steps.

Sub-step 509a, sequentially traversing the attribute value entries within the attribute value entry list and deleting repeated attribute value entries.

Similar to sub-step 508e, the computing server may adopt the method of setting a variable last_key to delete repeated attribute value entry. It is to be noted that, the purpose of deleting repeated attribute value entry in this sub-step is for accumulating (instead of deduplicating) entries having a same attribute value. Specifically, the computing server assigns last_key a value based on the view "Application ID" of line "key" in the Chart 18, traverses and deletes the repeated attribute value entry.

Sub-step 509b, each time one piece of repeated attribute value entry is deleted, increasing the counter value corresponding to this attribute value entry by 1, and thus obtaining a second characteristic value list with no repeated attribute value entry and containing the counter value.

Specifically, as the attribute value entry in the seventh row of the Chart 18 is the same as the attribute value entry in the fifth row, the computing server deletes the attribute value entry in the seventh row and adds the "value" of the attribute value entry in the fifth row by 1. At last, the obtained second characteristic value list through accumulation operation is shown as Chart 19.

CHART 19

| key | value |
|---|---|
| 11, 1 | 1 |
| 13, 1, 1 | 1 |
| 11, 2 | 1 |
| 13, 2, 1 | 1 |
| 11, 3 | 1 |
| 13, 3, 1 | 1 |
| 13, 3, 0 | 1 |

Step 510, obtaining the result of the indicator by analyzing the ID of the view combination and/or attribute value in each view in the view combination.

Specifically, the result of the indicator may be obtained by analyzing the view combination "Application ID" and the attribute value in view "Application ID". As a result, the computing server makes a conclusion that the number of online active person of application 1, 2 and 3 are 1, 1, and 2 respectively.

In an alternative preferred embodiment, the computing server may free the computation source occupied by the current task when the computation fails or the system is shut down, and reallocate that computation source to the computation of other indicators.

In another alternative preferred embodiment, if the computing server is a cluster of multiple computing server, the control sever may partition one data analysis task into multiple subtasks, and allocate these multiple subtasks to different sub-servers in the computing server respectively, to further improve the speed of data computation.

The method for data analysis in accordance with the present embodiment can finish the deduplication operation and the accumulation operation on the pipeline data by one mapper&reducer operation, thereby this method reduces the time and resource cost for data computation and improves the processing efficiency of the data analysis system.

Furthermore, the method for data analysis in accordance with the present embodiment is capable of performing operations concurrently for multiple view combinations corresponding to a same indicator through one time mapper&reducer operation. This method avoids the repeat reading of the pipeline data caused by the sequential computation of each view combination, and thereby can reduce the time cost for data analysis and involved processing resource.

Figure 6:
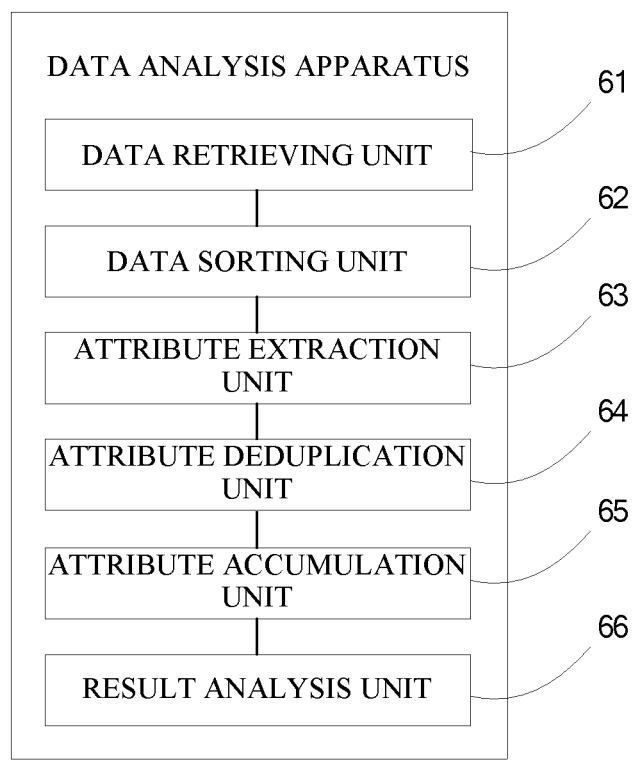
FIG. 6 shows structural diagram of an apparatus for data analysis in accordance with the embodiments of the present disclosure.

Referring to the method shown in FIG. 4 or FIG. 5, the disclosure further provides an apparatus for data analysis. The apparatus is located in the computing server 32 shown in FIG. 3, and is configured to implement the method shown in FIG. 4 or FIG. 5. As shown in FIG. 6, the apparatus includes: data retrieving unit 61, data sorting unit 62, attribute extraction unit 63, attribute deduplication unit 64, attribute accumulation unit 65, and result analysis unit 66. Wherein each unit is configured as follows.

The data retrieving unit 61 is configured to retrieve pipeline data piece by piece from the pipeline data set, the pipeline data include attribute values of multiple view;

The data sorting unit 62 is configured to perform normalization sorting for the pipeline data retrieved from the data retrieving unit 61 based on the attribute values in the predefined views;

The attribute extraction unit 63 is configured to obtain the attribute value entry list by extracting piece by piece attribute value entries from the normalization sorted pipeline data;

The attribute deduplication unit 64 is configured to obtain a first characteristic value list by performing deduplication operation on the extracted attribute value entry list through mapper operation;

The attribute accumulation unit 65 is configured to obtain a second characteristic value list by performing accumulation operation on the first characteristic value list through reducer operation;

The result analysis unit 66 is configured to obtain result of the predefined indicator by analyzing the second characteristic value list.

Figure 7:
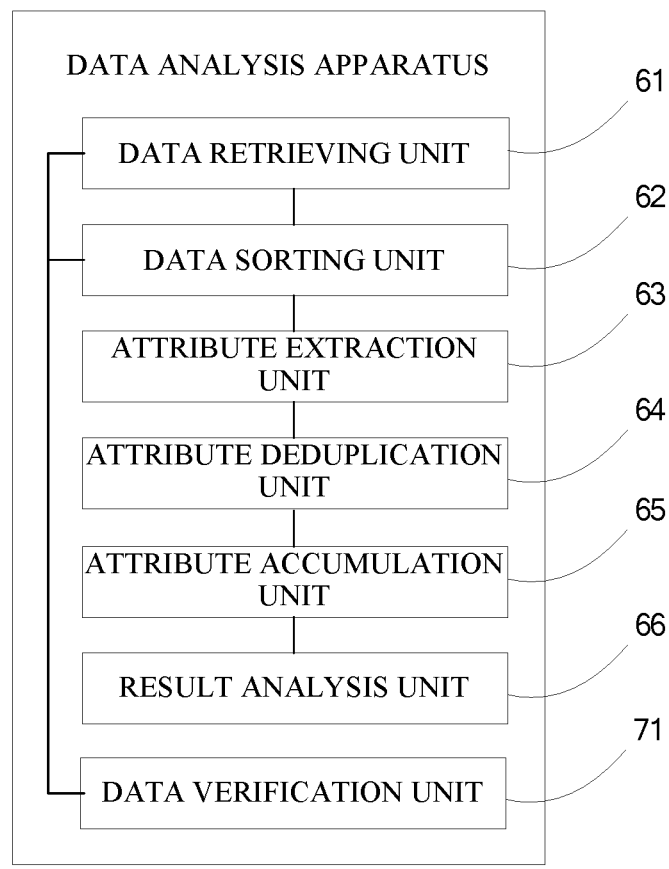
FIG. 7 shows structural diagram of another apparatus for data analysis in accordance with the embodiments of the present disclosure.

In an alternative embodiment, as shown in FIG. 7, the apparatus may further include:

an data verification unit 71, which is configured to verify the validity of the pipeline data retrieved from the data retrieving unit 61 before the data sorting unit 62 perform the normalization sort operation.

Further, the data sorting unit 62 is configured to sort the pipeline data with same attribute value in the predefined view as being adjacent to each other.

Figure 8:
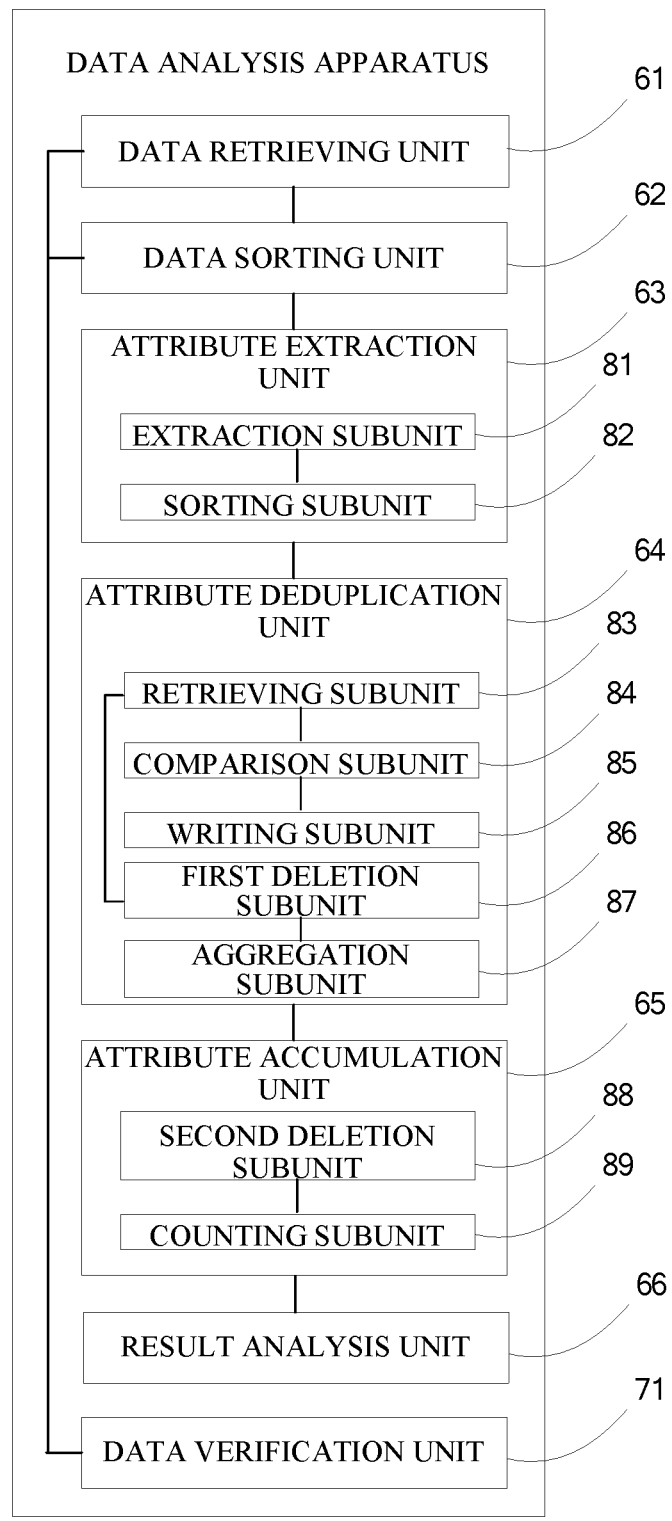
FIG. 8 shows structural diagram of yet another apparatus for data analysis in accordance with the embodiments of the present disclosure.

In another alternative embodiment, as shown in FIG. 8, the attribute extraction unit 63 may further include:

an extraction subunit 81, configured to extract respectively, based on at least one view combination, at least one piece of attribute value entry from each piece of pipeline data, wherein the view combination consists of at least one non-predefined view;

an sorting subunit 82, configured to sort the extracted attribute value entries with respect to each piece of pipeline data as being adjacent to each other, wherein the at least one piece of attribute value entry is extracted by the extraction subunit 81.

Specifically, the extraction subunit 81 is configured to obtain at least one attribute value by extracting attribute value corresponding to each non-predefined view in the view combination from the pipeline data respectively for each view combination, and to obtain one piece of attribute value entry by combining the attribute value in the predefined view, the ID of the view combination and the at least one attribute value together.

Further, as shown in FIG. 8, the attribute deduplication unit 64 includes:

a retrieving subunit 83, configured to sequentially retrieve the attribute value in the predefined view of each attribute value entry in the attribute value entry list;

a comparison subunit 84, configured to compare the attribute value in the predefined view retrieved from the retrieving subunit 83 with preset first attribute value variable;

a writing subunit 85, configured to write the corresponded attribute value entry into current first characteristic value child list when the two values compared in the comparison subunit 84 is same;

The writing subunit 85 is further configured to write the corresponded attribute value entry into a new first characteristic value child list, and write the attribute value in the predefined view into the first attribute value variable when the two values compared in the comparison subunit 84 is different;

a first deletion subunit 86, configured to sequentially traverse the attribute value entries within each first characteristic value child list and delete repeated attribute value entries;

an aggregation subunit 87, configured to obtain the first characteristic value list by aggregating multiple first characteristic value child list in which the repeated attribute value entries are removed.

Further, as shown in FIG. 8, the attribute accumulation unit 65 includes:

a second deletion subunit 88, configured to traverse the attribute value entries within the attribute value entry list and delete repeated attribute value entries;

a counting subunit 89, configured to obtain a second characteristic value list with no repeated attribute value entry and containing the counter value by increasing the counter value corresponding to this attribute value entry by 1 each time one piece of repeated attribute value entry is deleted.

Further, in the embodiment shown in FIG. 8, the result analysis unit 66 is configured to obtain the result of the indicator by analyzing the ID of the view combination and/or attribute value in each view in the view combination.

The apparatus for data analysis as described in the foregoing embodiments can perform preprocessing operation on the original pipeline data before the data analysis, such that the data size and computation complexity involved in the subsequent analysis process can be greatly reduced. In particular, the apparatus performs normalization sorting for the acquired pipeline data based on the attribute value in the predefined view, obtains the attribute value entry list by extracting attribute value entry from the normalization sorted pipeline data, performs deduplication and accumulation operation through one time mapper&reducer operation, and obtains the result of the indicator by analysis. Compared with the existed technology which needs twice mapper&reducer operations to have a result of an indicator, the disclosed apparatus may decrease the computation complexity for data analysis, and regarding the scenario of big data, the disclosed apparatus can avoid the happens of bottleneck of the database system and improve the efficiency of data analysis of the system.

Moreover, as the pipeline data to be processed have been through the preprocessing operation before data analysis, in which the acquired pipeline data have been normalization sorted based on the attribute value in the predefined view, the disclosed apparatus may sort the multiple pieces of pipeline data such that the pipeline data with a same attribute value in the predefined view is being adjacent to each other. In terms of cube data structure, this enables the apparatus to analyze the data in multiple view or view combinations concurrently when performing deduplication and accumulation operation. As compared with existed technology, the disclosed apparatus can accomplish data analysis in multiple view or view combinations once a time when the operator needs the data analysis of tens of thousands of views or view combinations, which avoids the occupancy of time and system computation resource during the multiple access of the pipeline data. When applied to cube data structure, the disclosed apparatus has another advantage of greatly improving the efficiency of data analysis of the system.

Figure 9:
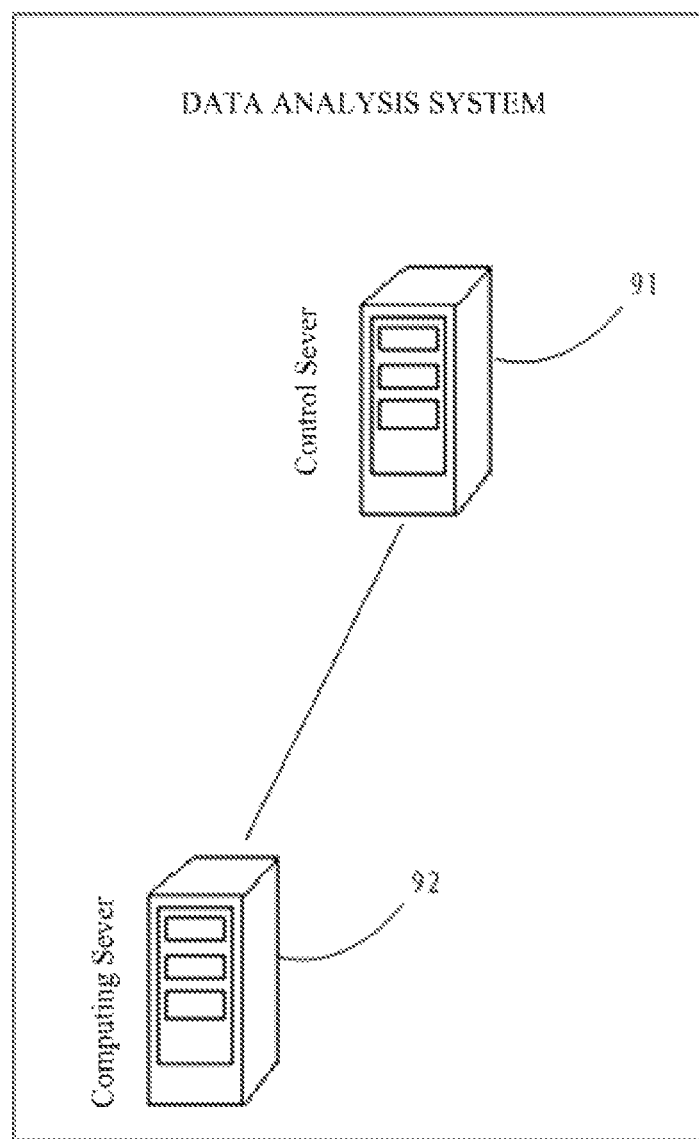
FIG. 9 shows structural diagram of another system for data analysis in accordance with the embodiments of the present disclosure.

Another embodiment of the disclosure provides a system for data analysis. As shown in FIG. 9, this system includes control server 91 and computing server 92. Wherein, the control server 91 is configured to sort multiple data analysis tasks in priority order, submit data analysis tasks to the computing server 92, and receive and record the data analysis status of the computing server 92;

the computing server 92 is configured to: retrieve pipeline data piece by piece from the pipeline data set based on the data analysis task submitted by the control server 91, wherein the pipeline data include attribute values of multiple view; perform normalization sorting for the acquired pipeline data based on the attribute values in the predefined views; obtain the attribute value entry list by extracting piece by piece attribute value entries from the normalization sorted pipeline data; obtain a first characteristic value list by performing deduplication operation on the extracted attribute value entry list through mapper operation; obtain a second characteristic value list by performing accumulation operation on the first characteristic value list through reducer operation; and to obtain result of the predefined indicator by analyzing the second characteristic value list.

In an alternative embodiment, the computing server 92 may be a cluster of distributed computing server 92, said cluster of distributed computing server 92 includes at least two sub-computing servers 92;

In this embodiment, the control server is further configured to partition the data analysis task into at least two subtasks and allocate these at least two subtasks to at least two sub-computing servers 92.

The system for data analysis as described in the foregoing embodiments can perform preprocessing operation on the original pipeline data before the data analysis, such that the data size and computation complexity involved in the subsequent analysis process can be greatly reduced. In particular, the system performs normalization sorting for the acquired pipeline data based on the attribute value in the predefined view, obtains the attribute value entry list by extracting attribute value entry from the normalization sorted pipeline data, performs deduplication and accumulation operation through one time mapper&reducer operation, and obtains the result of the indicator by analysis. Compared with the existed technology which needs twice mapper&reducer operations to have a result of an indicator, the disclosed system may decrease the computation complexity for data analysis, and regarding the scenario of big data, the disclosed system can avoid the happens of bottleneck of the database system and improve the efficiency of data analysis of the system.

Moreover, as the pipeline data to be processed have been through the preprocessing operation before data analysis, in which the acquired pipeline data have been normalization sorted based on the attribute value in the predefined view, the disclosed system may sort the multiple pieces of pipeline data such that the pipeline data with a same attribute value in the predefined view is being adjacent to each other. In terms of cube data structure, this enables the system to analyze the data in multiple view or view combinations concurrently when performing deduplication and accumulation operation. As compared with existed technology, the disclosed system can accomplish data analysis in multiple view or view combinations once a time when the operator needs the data analysis of tens of thousands of views or view combinations, which avoids the occupancy of time and system computation resource during the multiple accesses of the pipeline data. When applied to cube data structure, the disclosed system has another advantage of greatly improving the efficiency of data analysis of the system.

Those skilled in the art can understand that parts of or all the steps implemented to achieve the above embodiments may be performed by hardware, and also may be performed by a computer program instructing relevant hardware. The program may be stored in a computer readable tangible storage medium. When the program is run, the processes of the method according to the foregoing embodiments may be performed. The storage medium may be a magnetic disk, an optical disk, a read-only memory (Read-Only Memory, ROM), a random access memory (Read-Only Memory, RAM), and so on.

Figure 10:
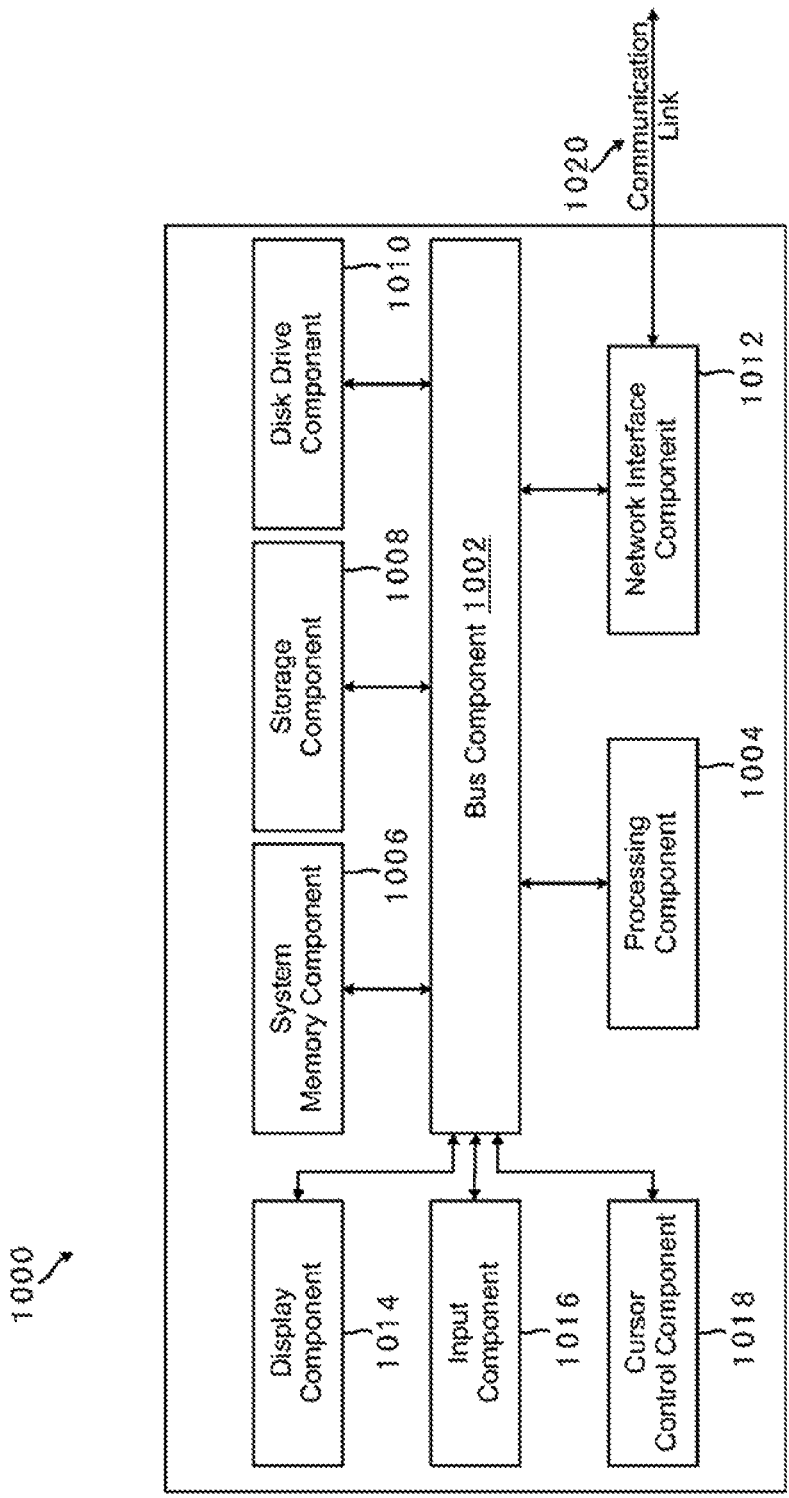
FIG. 10 is a block diagram of an exemplary computing system 1000 suitable for implementing embodiments of the present disclosure.

FIG. 10 is a block diagram of an exemplary computing system 1000 suitable for implementing embodiments of the present disclosure. The computing system 1000 includes a bus 1002 or other communication mechanism for communicating information, which interconnects subsystems and components, including one or more of a processing component 1004 (e.g., processor, micro-controller, digital signal processor (DSP), etc.), a system memory component 1006 (e.g., RAM), a static storage component 1008 (e.g., ROM), a network interface component 1012, a display component 1014 (or alternatively, an interface to an external display), an input component 1016 (e.g., keypad or keyboard), and a cursor control component 1018 (e.g., a mouse pad).

In accordance with embodiments of the present disclosure, the computing system 1000 performs specific operations by processor 1004 executing one or more sequences of one or more instructions contained in system memory component 1006. Such instructions may be read into system memory component 1006 from another computer readable medium, such as static storage component 1008. In other embodiments, hard-wired circuitry may be used in place of or in combination with software instructions for implementation of one or more embodiments of the disclosure.

Logic may be encoded in a non-transitory computer readable medium, which may refer to any medium that participates in providing instructions to processor 1004 for execution. Such a medium may take many forms, including but not limited to, non-volatile media, volatile media, and transmission media. In various implementations, volatile media includes dynamic memory, such as system memory component 1006, and transmission media includes coaxial cables, copper wire, and fiber optics, including wires that comprise bus 1002. Memory may be used to store visual representations of the different options for payments or transactions. In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by the computing system 1000. In various other embodiments, a plurality of computing systems 1000 coupled by communication link 1020 may perform instruction sequences to practice the disclosure in coordination with one another. Computing system 1000 may transmit and receive messages, data, information and instructions, including one or more programs (i.e., application code) through communication link 1020 and communication interface 1012. Received program code may be executed by processor 1004 as received and/or stored in disk drive component 1010 or some other non-volatile storage component for execution.

The embodiments referred above are just some preferred embodiments of the present disclosure, and may not be used to limit the disclosure. Any modifications, equivalent replacements or improvements that fall within the spirit and principle of the present disclosure should be embraced in the protection scope of the disclosure.

What is claimed is:

1. A method for data analysis, comprising:

retrieving, by a server, pipeline data from a pipeline data set piece by piece in a chronological order, wherein each piece of pipeline data includes a plurality of attribute values, wherein every time a user performs an online operation, one piece of pipeline data is obtained; each piece of pipeline data describes a single online operation behavior of the user; and each of the plurality of attribute values includes a descriptor illustrating the online operation behavior of the user;

performing, by the server, normalization sorting of the retrieved pipeline data based on a predefined attribute value of the plurality of attribute values, comprising:
selecting one of the plurality of attribute values as the predefined attribute value; and
rearranging the chronological order of the pipeline data by sorting the pipeline data based on the predefined attribute value, and such that the sorted pipeline data with same attribute value being arranged adjacent to each other;

obtaining, by the server, an attribute value entry list by extracting attribute value entries from the normalization sorted pipeline data piece by piece;

obtaining, by the server, a first characteristic value list by performing a deduplication operation on the attribute value entry list through mapper operation, comprising:
sequentially retrieving, by the server, the attribute value in a predefined view of each attribute value entry in the attribute value entry list;
comparing, by the server, the acquired attribute value in the predefined view with a preset first attribute value variable;
writing, by the server, the corresponded attribute value entry into current first characteristic value child list if a comparison result is equal;
writing, by the server, the corresponded attribute value entry into a new first characteristic value child list and writing the attribute value in the predefined view into the first attribute value variable, if the comparison result is not equal;
sequentially traversing, by the server, attribute value entries within each first characteristic value child list and deleting repeated attribute value entry; and
obtaining, by the server, the first characteristic value list by aggregating multiple first characteristic value child list in which the repeated attribute value entry is removed;

obtaining, by the server, a second characteristic value list by performing an accumulation operation on the first characteristic value list through reducer operation; and obtaining, by the server, a result of the predefined indicator by analyzing the second characteristic value list, wherein, by performing the normalization sorting of the retrieved pipeline data before performing the deduplication operation and the accumulation operation, a number of times of the deduplication operation and the accumulation operation is reduced, occupancy of time and system computation resource during the multiple accesses of the pipeline data is avoided, and an efficiency of data analysis is improved.

2. The method of claim 1, further comprising:
verifying, by the server, the validity of the retrieved pipeline data before performing normalization sorting of the retrieved pipeline data.

3. The method of claim 1, wherein the step of obtaining, by the server, the attribute value entry list comprises:
extracting respectively, by the server, based on at least one view combination, at least one piece of attribute value entry from each piece of pipeline data, wherein the view combination consists of at least one non-predefined view; and
sorting, by the server, the extracted attribute value entries with respect to each piece of pipeline data as being adjacent to each other,
wherein the step of extracting respectively at least one piece of attribute value entry from each piece of pipeline data comprises:
for each view combination, respectively obtaining, by the server, at least one attribute value by extracting attribute value corresponding to each non-predefined view in the view combination from the pipeline data; and
obtaining, by the server, attribute value entry by combining the attribute value in the predefined view, an identity (ID) of the view and the at least one attribute value together.

4. The method of claim 3, wherein the step of obtaining, by the server, the second characteristic value list by performing the accumulation operation on the first characteristic value list through the reducer operation, comprises:
sequentially traversing, by the server, the attribute value entries within the attribute value entry list and deleting repeated attribute value entry;
each time one piece of repeated attribute value entry is deleted, increasing, by the server, the counter value corresponding to this attribute value entry by 1, and thus obtaining the second characteristic value list with no repeated attribute value entry and containing the counter value.

5. The method of claim 4, wherein the step of obtaining, by the server, the result of the predefined indicator comprises:
obtaining, by the server, the result of the indicator by analyzing the ID of the view combination and/or attribute value in each view in the view combination.

6. The method of claim 1, wherein when computing multiple predefined indicators, the method further comprises:
sorting, by the server, the multiple predefined indicators in priority order based on at least one of the following indicator parameters: computation complexity, the importance or emergency; and
computing, by the server, the multiple predefined indicators in descending priority order.

7. The method of claim 1, further comprising:
freeing, by the server, resource for computing the current indicator when the computation fails.

8. The method according to claim 1, wherein the plurality of attribute values include a user identity (user ID), an application identity (application ID), a gender of user, an age of user, or a start clock of operation.

9. The method according to claim 1, wherein the pipeline data includes a social networking services (SNS) website identity (website ID).

10. The method of claim 1, after obtaining, by the server, the result of the predefined indicator by analyzing the second characteristic value list, further comprising:
identifying whether the result of the predefined indicator is obtained successfully;
when the result of the predefined indicator is obtained successfully, returning, by the server, a data analysis successful status flag;
when the result of the predefined indicator is not obtained successfully, returning, by the server, a data analysis unsuccessful status flag.

11. An apparatus for data analysis, comprising:
a memory; and
a processor coupled to the memory, wherein the processor is configured to:
retrieve pipeline data from a pipeline data set piece by piece in a chronological order, wherein each piece of pipeline data includes a plurality of attribute values; every time a user performs an online operation, one piece of pipeline data is obtained; each piece of pipeline data describes one time of online operation behavior of the user; and each of the plurality of attribute values includes a descriptor illustrating the online operation behavior of the user;
perform normalization sorting of the retrieved pipeline data based on a predefined attribute value of the plurality of attribute values, comprising:
select one of the plurality of attribute values as the predefined attribute value; and
rearrange the chronological order of the pipeline data by sorting the pipeline data based on the predefined attribute value, and such that the sorted pipeline data with same attribute value being arranged adjacent to each other;
obtain an attribute value entry list by extracting attribute value entries from the normalization sorted pipeline data;
obtain a first characteristic value list by performing a deduplication operation on the attribute value entry list through mapper operation, comprising:
sequentially retrieving the attribute value in a predefined view of each attribute value entry in the attribute value entry list;
comparing the acquired attribute value in the predefined view with preset first attribute value variable;
writing the corresponded attribute value entry into current first characteristic value child list if a comparison result is equal;
writing the corresponded attribute value entry into a new first characteristic value child list and write the attribute value in the predefined view into the first attribute value variable if the comparison result is not equal;
sequentially traversing the attribute value entries within each first characteristic value child list and delete repeated attribute value entries; and
obtaining the first characteristic value list by aggregating multiple first characteristic value child list in which the repeated attribute value entries are removed;

obtain a second characteristic value list by performing an accumulation operation on the first characteristic value list through reducer operation; and obtain a result of the predefined indicator by analyzing the second characteristic value list, wherein, by performing the normalization sorting of the retrieved pipeline data before performing the deduplication operation and the accumulation operation, a number of times of the deduplication operation and the accumulation operation is reduced, occupancy of time and system computation resource during the multiple accesses of the pipeline data is avoided, and an efficiency of data analysis is improved.

12. The apparatus of claim 11, wherein the processor is further configured to:

verify the validity of the retrieved pipeline data before performing normalization sorting of the retrieved pipeline data.

13. The apparatus of claim 11, wherein the processor is further configured to:

extract respectively, based on at least one view combination, at least one piece of attribute value entry from each piece of pipeline data, wherein the view combination consists of at least one non-predefined view; and sort the extracted attribute value entries with respect to each piece of pipeline data as being adjacent to each other, wherein for each view combination, respectively obtain at least one attribute value by extracting attribute value corresponding to each non-predefined view in the view combination from the pipeline data; and obtain attribute value entry by combining the attribute value in the predefined view, an identity (ID) of the view combination and the at least one attribute value together.

14. The apparatus of claim 13, wherein the processor is further configured to:

sequentially traverse the attribute value entries within the attribute value entry list and delete repeated attribute value entries; and increase the counter value corresponding to this attribute value entry by 1 each time one piece of repeated attribute value entry is deleted, and thus obtain a second characteristic value list with no repeated attribute value entry and containing the counter value.

15. The apparatus of claim 14, wherein the processor is further configured to obtain the result of the indicator by analyzing the ID of the view combination and/or attribute value in each view in the view combination.

16. The apparatus of claim 11, wherein after obtain a result of the predefined indicator by analyzing the second characteristic value list, the processor is further configured to:

identify whether the result of the predefined indicator is obtained successfully;

when the result of the predefined indicator is obtained successfully, return a data analysis successful status flag;

when the result of the predefined indicator is not obtained successfully, return a data analysis unsuccessful status flag.

17. A system for data analysis, comprising a control server and a computing server, wherein, the control server is configured to sort multiple data analysis tasks in priority order, submit data analysis tasks to the computing server, and receive and record the data analysis status of the computing server;

the computing server is configured to:

retrieve pipeline data from a pipeline data set piece by piece in a chronological order, wherein each piece of pipeline data includes a plurality of attribute values; every time a user performs an online operation, one piece of pipeline data is obtained; each piece of pipeline data describes one time of online operation behavior of the user; and each of the plurality of attribute values includes a descriptor illustrating the online operation behavior of the user;

perform normalization sorting of the retrieved pipeline data based on a predefined attribute value of the plurality of attribute values, comprising:

select one of the plurality of attribute values as the predefined attribute value; and rearrange the chronological order of the pipeline data by sorting the pipeline data based on the predefined attribute value, and such that the sorted pipeline data with same attribute value being arranged adjacent to each other;

obtain an attribute value entry list by extracting attribute value entries from the normalization sorted pipeline data;

obtain a first characteristic value list by performing a deduplication operation on the attribute value entry list through mapper operation, comprising:

sequentially retrieving the attribute value in a predefined view of each attribute value entry in the attribute value entry list;

comparing the acquired attribute value in the predefined view with preset first attribute value variable;

writing the corresponded attribute value entry into current first characteristic value child list if a comparison result is equal;

writing the corresponded attribute value entry into a new first characteristic value child list and write the attribute value in the predefined view into the first attribute value variable if the comparison result is not equal;

sequentially traversing the attribute value entries within each first characteristic value child list and delete repeated attribute value entries; and obtaining the first characteristic value list by aggregating multiple first characteristic value child list in which the repeated attribute value entries are removed;

obtain a second characteristic value list by performing an accumulation operation on the first characteristic value list through reducer operation; and obtain a result of the predefined indicator by analyzing the second characteristic value list, wherein, by performing the normalization sorting of the retrieved pipeline data before performing the deduplication operation and the accumulation operation, a number of times of the deduplication operation and the accumulation operation is reduced, occupancy of time and system computation resource during the multiple accesses of the pipeline data is avoided, and an efficiency of data analysis is improved.

18. The system of claim 17, wherein the computing server is a cluster of distributed computing servers, said cluster of distributed computing servers comprises at least two sub-computing servers;

and wherein the control server is further configured to partition the data analysis task into at least two subtasks and allocate these at least two subtasks to at least two sub-computing servers.

* * * * *